United States Patent [19]

Wortmann et al.

[11] 4,098,968

[45] Jul. 4, 1978

[54] PROCESS FOR IMPARTING ANTISTATIC PROPERTIES TO RUBBER

[75] Inventors: Joachim Wortmann, Turnich; Franz-Josef Dany, Erftstadt; Joachim Kandler, Erftstadt; Hans Peter Beu, Erftstadt, all of Germany

[73] Assignee: Hoechst Aktiengesellschaft, Frankfurt am Main, Germany

[21] Appl. No.: 780,988

[22] Filed: Mar. 24, 1977

[30] Foreign Application Priority Data

Mar. 27, 1976 [DE] Fed. Rep. of Germany ....... 2613126

[51] Int. Cl.[2] ............ C08K 3/04

[52] U.S. Cl. ............ 526/1; 260/42.31; 423/445; 423/450

[58] Field of Search ............ 252/511; 526/1; 260/42.31, 42.32; 423/445, 450

[56] References Cited

U.S. PATENT DOCUMENTS

| | | | |
|---|---|---|---|
| 2,597,741 | 5/1952 | Macey | 252/511 |
| 3,692,702 | 9/1972 | Lania | 252/511 |

OTHER PUBLICATIONS

Kirk-Othmer Encyclopedia of Chemical Technology, 2nd ed., vol. 4, pp. 251-267, 276-280.

*Primary Examiner*—Paul R. Michl
*Attorney, Agent, or Firm*—Connolly and Hutz

[57] ABSTRACT

Antistatic properties are imparted to rubber by admixing it with conductive carbon black, vulcanizing the resulting blend and forming the rubber. More specifically, the rubber is admixed with about 5 to 40 weight % of conductive carbon black which has an AS-number of 15 to 35, a specific electric resistance of $10^{-1}$ up to $10^{-3}$ ohms $\times$ cm under a moulding pressure of 100 to 180 atmospheres absolute, a bulk density of 100 to 180 g/liter, a BET-surface area of 100 to 1000 $m^2/g$. The carbon black is made by a process wherein an aqueous suspension of carbon black with an AS-number higher than 15 and prepared by subjecting hydrocarbons, which are liquid at room temperature, to thermal conversion at 1200° to 2000° C, under pressures within the range 1 and 80 atmospheres absolute, and in the presence of oxygen or an oxygen-containing gas, and water scrubbing the resulting carbon-black-containing reaction gas, is intimately blended at 5° to 120° C, under pressures of 1 to 20 atmospheres absolute, in liquid phase at a pH-value of 7 to 10, and for 1 to 20 minutes, with vaporizable liquid aliphatic or cycloaliphatic hydrocarbons, the carbon black is separated from liquid matter, then heated and thereby freed from hydrocarbons and water, and finally annealed for 20 to 30 minutes at 200° C up to 2200° C.

5 Claims, No Drawings

PROCESS FOR IMPARTING ANTISTATIC PROPERTIES TO RUBBER

The present invention relates to a process for imparting antistatic properties to rubber by blending the rubber, which may be used in combination with one or more addends, if desired, with special grade conductive carbon black, vulcanizing the resulting mixture, and forming the rubber.

Pure rubber made by subjecting natural or synthetic rubber to vulcanization possesses good electrical insulating properties. In certain cases, it is even desirable for reasons of safety to have rubber which possesses some antistatic properties so that it is not liable to acquire a static charge which may be followed by a sudden electric discharge. A factor which critically determines the antistatic behaviour of a material is a surface resistance not higher than $10^9$ ohm which is determined in accordance with DIN (German Industrial Standard) test 53 596. Articles made from antistatic rubber comprise, for example, conveyor belts of the kind used in the mining industries, shoes and protective clothing for medical personnel in operating-rooms. In other words, antistatic materials are required to be used in all those cases in which sparking is hazardous.

The use of special grade carbon black for incorporation with rubber to improve its electric conductivity and some of its mechanical properties has long been known in rubber-processing. It is also known in the art that considerable quantities of carbon black are required to be used so as to impart satisfactory antistatic properties to rubber. This however is a very expensive procedure which necessitates long periods for incorporation of the carbon black, and adversely affects the initial properties, especially the tear strength, of the rubber.

We have now found that carbon black pretreated in accordance with the present invention enables the adverse effects encountered heretofore in imparting antistatic properties to rubber material by means of standard carbon black, to be avoided. It is more particularly possible for the rubber to be admixed with relatively minor proportions of such pretreated carbon black to produce the desired result.

The present invention relates more particularly to an improved process for imparting antistatic properties to rubber by blending the rubber and, if desired, addends, with conductive carbon black, vulcanizing the resulting blend and forming the rubber, the improvement according to which the rubber of rubber blend is admixed with about 5 to 40 weight % of conductive carbon black having a water absorption stiffness (AS-number) of 15 to 35, a specific electric resistance of $10-1$ up to $10^{-3}$ ohms . cm under a moulding pressure of 100 to 180 atmospheres absolute, a bulk density of 100 to 180 g/liter, a BET-surface area of 100 to 1000 $m^2/g$, the carbon black having been made by a process wherein an aqueous suspension of carbon black with an AS-number higher than 15 and prepared by subjecting hydrocarbons, which are liquid at room temperature, to thermal conversion at 1200° to 2000° C, under pressures within the range 1 and and 80 atmospheres absolute, and in the presence of oxygen or an oxygen-containing gas, and water scrubbing the resulting carbon black-containing reaction gas, is intimately blended at temperatures within the range 5° and 120° C, under pressures within the range 1 and 20 atmospheres absolute, in liquid phase at a pH-value of 7 to 10, and for a period of 1 to 20 minutes, with vaporizable liquid aliphatic or cycloaliphatic hydrocarbons, the carbon black is separated from liquid matter, then heated and thereby freed from hydrocarbons and water, and finally annealed for 20 to 30 minutes at 200° C up to 2200° C.

The process of the present invention enables antistatic properties to be imparted to natural and synthetic rubbers. To this end, it is good practice to blend the rubber preferably with 10 to 20 weight % of carbon black based on the rubber. The resulting blend of rubber, carbon black and, if desired, addends and processing aids, is readily workable, e.g. by vulcanization. The terms "addends" and "processing aids" as used herein comprise, e.g. vulcanization accelerators, softeners, stabilizers, and lubricants.

The following statements are intended further to identify the particular carbon black used in the present process, and its preparation.

The starting materials used for making the carbon black are selected, for example, from high-boilling hydrocarbons, such as heavy fuel oil. These are burnt in conventional manner at about 1400° C and under pressure, and the resulting carbon black is separated from the combustion gases by scrubbing with water. The aqueous carbon black suspension so obtained, which has a pH of 7 to 10 and contains between about 5 and 40 g of carbon black per liter of suspension, is intimately blended with one or more vaporizable hydrocarbons, preferably with those which have a boiling point within the range 30° to 90° C, e.g. gasoline, and the resulting carbon black is separated from the liquid phase. Following this, the carbon black is dried at about 200° C and then annealed for 5 to 15 minutes at a preferred temperature within the range 1400° to 1800° C in the presence of nitrogen, hydrogen or carbon monoxide. It is also possible for the carbon black to be annealed at the above temperatures in the presence of chlorine gas, hydrogen chloride or one more halogen-yielding compounds.

The carbon black may incorporated in conventional manner into the rubber, if desired in admixture with further addends and processing aids, e.g. with the use of a mixing roller or kneader, and the resulting blend may then be subjected to forming vulcanization.

The process of the present invention compares favorably with the prior art methods inasmuch as the carbon black used in accordance with this invention enables the flow resistance and passage resistance of rubber to be reduced to an extent not accessible heretofore without any significant adverse effects on the rubber's mechanical properties. This desirable technical effect is a result of the special treatment of the carbon black or an aqueous suspension thereof with vaporizable aliphatic or cycloaliphatic hydrocarbons.

The following Examples illustrate the invention.

The starting material used for making the carbon black was carbon black, which was obtained in the form of an aqueous suspension containing 15 g of carbon black per liter by subjecting heavy fuel oil to a thermal conversion reaction with hydrogen and steam at 1400° C and under a pressure of 50 atm. abs., and waterscrubbing the resulting reaction gas.

200 1 of the aqueous carbon black suspension, which had a pH of 9, was placed in an agitator-provided vessel, admixed with 6 kg of gasoline (boiling range = 30°-90° C) and the mixture was stirred for 10 minutes at 25° C and under a pressure of 1.2 atm. abs. to separate carbon black therefrom. 20 weight % of the resulting product was carbon black, 40 weight % was gasoline and 40 weight % was water.

The product was freed from gasoline and water by heating to 200° C, and 3 kg of dry carbon black was obtained. The carbon black so freed from water and gasoline was subdivided in various specimens and the individual specimens were all annealed for 60 minutes under nitrogen, however, at temperatures ranging from 230° up to 1800° C.

The carbon black specimens so made, whose properties are indicated in Table 1, were incorporated into various kinds of rubber and the latter were identified after vulcanization as to their flow resistance, surface resistance, tensile strength, modulus 300, elongation at break and shore A-hardness.

The flow resistance and surface resistance were determined according to DIN 55 596. The results are expressed as follows:

(a) flow resistance in [ohm . cm]

(b) surface resistance in [ohm ]

The ultimate tensile strength, modulus 300 and elongation at break were determined according to DIN 53 304. The results are indicated as follows:

(a) ultimate tensile strength ($kg/cm^2$)

(b) modulus 300 ($kg/cm^2$)

(c) elongation at break (%)

The Shore-hardness was determined according to DIN 53 505. The results are indicated in (°Shore A).

EXAMPLE 1 (Invention)

A rubber blend was made on a mixing roller (friction = 1:1.25) at 90° C from the following components:

| | | |
|---|---|---|
| Natural rubber, smoked sheets | 100 | parts by weight |
| Stearic acid | 1 | part by weight |
| Phenyl-β-naphthylamine | 1 | part by weight |
| Naphtholen ZD (a commercially available product of Bayer Aktiengesellschaft, Leverkusen) | 3 | parts by weight |
| Active zinc oxide | 4 | parts by weight |
| Flowers of sulfur | 2.5 | parts by weight |
| Diphenylguanidine | 0.2 | parts by weight |
| 2-dibenzothiacyl disulfide | 1 | part by weight |
| Carbon black, annealed at 400° C | 10 | parts by weight |

Next, the rubber blend was heated for 25 minutes to 135° C and vulcanized.

In the above formulation, stearic acid was used as a dispersant, and phenyl-β-naphthylamine was used as an anti-ageing agent. Naptholen ZD is a commercially available unpolar softener, based on petroleum. Active zinc oxide was used to activate the vulcanization and as a cross-linking filler. Sulfur was used as a cross-linking agent improving the physical properties of the vulcanized material. Diphenylguanidine and 2-benzothiacyl were used as agents accelerating the vulcanization.

The physical and electric properties of the vulcanized test specimen are indicated in Table 2 hereinafter, and the characteristic properties of the carbon black are indicated in Table 1 hereinafter.

EXAMPLES 2 to 4 (Invention)

The procedure was the same as that described in Example 1, but the individual rubber blends were admixed with 20, 30 and 40 parts by weight, respectively, of carbon black per 100 parts by weight of rubber.

The physical and electric properties of the vulcanized rubber specimens are indicated in Table 2 hereinafter.

EXAMPLES 5 to 10 (Invention)

Vulcanized rubber specimens containing carbon black were prepared in the manner described in Example 1, but carbon black grades annealed at 230° C, 300° C, 600° C, 1000° C, 1500° C and 1800° C, respectively, were used. The electric and physical properties of the individual test specimens are indicated in Table 2 hereinafter, and the characteristic properties of the various carbon black grades are indicated in Table 1 hereinafter.

EXAMPLE 11 (Comparative Example)

A vulcanized rubber specimen was prepared in the manner described in Example 1, but the carbon black was FLAMMRUSS 101 (this is a registered trade mark) a commercially available product of Degussa, Frankfurt/Main. FLAMMRUSS 101 has a BET-surface area of 21 $m^2/g$ and a specific electric resistance of 0.04 ohm . cm at 300 atm. abs. An aqueous suspension of the carbon black has a pH of 7.

The electric and physical properties of the vulcanized test specimen are indicated in Table 2 hereinafter.

EXAMPLE 12 (Comparative Example)

A vulcanized rubber specimen was prepared in the manner described in Example 1, but the carbon black was special furnace carbon black CORAX L (this is a registered trade mark), a commercially available product of Degussa, Frankfurt/Main. CORAX L has a BET-surface area of 150 $m^2/g$, and an aqueous suspension thereof has a pH of 7.

The electric and physical properties of the vulcanized test specimen are indicated in Table 2 hereinafter

EXAMPLE 13 (Comparative Example)

A vulcanized rubber specimen was prepared in the manner described in Example 1, but the carbon black was compressed acetylene carbon black termed Acetogen (Acetogen is a registered trade mark) carbon black (a commercially available product produced formerly by Knapsack Aktiengesellschaft, Knapsack bei cologne, meanwhile merged into Hoechst Aktiengesellschaft, Frankfurt/Main).

Acetogen carbon black has a BET-surface area of 70 $m^2/g$ and a water absorption stiffness of 22 ml/5 g. The AS-number indicates that quantity in ml of a water/acetone-mixture (mixing ratio 9:1) which is needed to form a single ball from 5 g of carbon black in a round flask by continually turning the flask.

The electric and physical properties of the test specimen are indicated in Table 2 hereinafter.

EXAMPLE 14 (Comparative Example)

A vulcanized rubber specimen was prepared in the manner described in Example 1, but the specimen was left free from carbon black. The electric and physical properties of the vulcanized test specimen are indicated in Table 2 hereinafter.

EXAMPLE 15 (Invention)

A synthetic rubber blend was made on a mixing roller (friction: 1:1.25) at 100° C from the following components.

| | | |
|---|---|---|
| Styrene-butadiene-rubber (BUNA 1500) (this is a registered Trade Mark of Chemische Werke Huls AG, | 100 | parts by weight |

-continued

| | | |
|---|---|---|
| Marl) | | |
| Stearic acid | 2.5 | parts by weight |
| Phenyl-β-naphthylamine | 1.0 | parts by weight |
| Active zinc oxide | 3.0 | parts by weight |
| 2-Dibenzothiacyl disulfide | 1.5 | parts by weight |
| Diphenylguanidine | 0.5 | parts by weight |
| Flowers of sulfur | 2.5 | parts by weight |
| Carbon black, annealed at 400° C | 20.0 | parts by weight |

Next, the blend was vulcanized by heating it for 20 minutes to 150° C. The vulcanized rubber specimen was tested for its electric and physical properties. The results are indicated in Table 3 hereinafter.

EXAMPLE 16 (Comparative Example)

A vulcanized specimen was prepared from the synthetic rubber blend of Example 15, but the blend was admixed with FLAMMRUSS 101. The vulcanized rubber specimen was tested for its electric and physical properties. The test results are indicated in Table 3 hereinafter.

EXAMPLE 17 (Comparative Example)

A vulcanized specimen was prepared from the synthetic rubber blend of Example 15, but the blend was admixed with CORAX L carbon black. The electric and physical properties determined for the vulcanized rubber specimen are indicated in Table 3 hereinafter.

EXAMPLE 18 (Comparative Example)

A vulcanized specimen was prepared from the synthetic rubber blend of Example 15, but the blend was admixed with ACETOGEN carbon black. The electric and physical properties determined for the vulcanized rubber specimen are indicated in Table 3 hereinafter.

EXAMPLE 19 (Comparative Example)

A vulcanized specimen was prepared from the synthetic rubber blend of Example 15, but the blend was left free from carbon black. The electric and physical properties determined for the vulcanized rubber specimen are indicated in Table 3 hereinafter.

As results from the following Tables 2 and 3, the rubber treated with the carbon black of the present invention has a flow resistance and surface resistance considerably lower than rubber treated with identical proportions of conventional carbon black, or left free from carbon black. In other words, the carbon black of the present invention compares very favorably in this respect with prior art carbon black grades. By the addition of the carbon black of this invention, it is possible to avoid adverse effects on, and partially to even improve, the physical properties of rubber.

TABLE 1

| Example | Annealing temperature (° C) | BET-surface area ($m^2/g$) | pH-value of aqueous suspension | AS-number (ml/5 g) |
|---|---|---|---|---|
| 1-4 and 15 | 400 | 690 | 9.2 | 32.0 |
| 5 | 230 | 690 | 7.9 | 32.5 |
| 6 | 300 | 690 | 7.9 | 31.0 |
| 7 | 600 | 670 | 8.2 | 29.0 |
| 8 | 1000 | 640 | 9.7 | 25.0 |
| 9 | 1500 | 260 | 9.2 | 21.5 |
| 10 | 1800 | 160 | 9.4 | 20.0 |

TABLE 2

| Ex. | Parts by weight carbon black (g) | Flow resistance (ohm × cm) | Surface resistance (ohm) | Tensile strength ($kg/cm^2$) | Load at 300% elongation ($kg/cm^2$) | Elongation at break (%) | Hardness ° Shore A |
|---|---|---|---|---|---|---|---|
| 1 | 10 | $1 \cdot 10^7$ | $4 \cdot 10^5$ | 342 | 43 | 650 | 53 |
| 2 | 20 | 40 | $1 \cdot 10^3$ | 325 | 64 | 640 | 58 |
| 3 | 30 | 10 | 100 | 310 | 89 | 620 | 62 |
| 4 | 40 | 2 | 17 | 286 | 125 | 590 | 72 |
| 5 | 10 | $1 \cdot 10^7$ | $5 \cdot 10^5$ | 321 | 36 | 640 | 51 |
| 6 | 10 | $1 \cdot 10^5$ | $1 \cdot 10^5$ | 346 | 42 | 650 | 53 |
| 7 | 10 | $5 \cdot 10^4$ | $1 \cdot 10^5$ | 353 | 46 | 645 | 56 |
| 8 | 10 | $1 \cdot 10^5$ | $6 \cdot 10^4$ | 346 | 42 | 650 | 53 |
| 9 | 10 | $1 \cdot 10^7$ | $2 \cdot 10^5$ | 342 | 41 | 655 | 51 |
| 10 | 10 | $1 \cdot 10^7$ | $4 \cdot 10^5$ | 339 | 40 | 650 | 52 |
| 11 | 10 | $10^{14}$ | $10^{14}$ | 320 | 49 | 615 | 52 |
| 12 | 10 | $10^{14}$ | $10^{13}$ | 326 | 45 | 635 | 51 |
| 13 | 10 | $10^{14}$ | $10^{13}$ | 301 | 38 | 610 | 53 |
| 14 | 0 | $10^{14}$ | $10^{14}$ | 315 | 23 | 660 | 47 |

TABLE 3

| Ex. | Parts by weight carbon black (g) | Flow resistance (ohm × cm) | Surface resistance (ohm) | Tensile strength ($kg/cm^2$) | Load at 200% elongation ($kg/cm^2$) | Elongation at break (%) | Hardness ° Shore A |
|---|---|---|---|---|---|---|---|
| 15 | 20 | 24 | $9.5 \cdot 10^3$ | 223 | 47 | 510 | 60 |
| 16 | 20 | $>10^{11}$ | $>10^{11}$ | 165 | 40 | 470 | 62 |
| 17 | 20 | $1 \cdot 10^{11}$ | $1 \cdot 10^{11}$ | 175 | 38 | 490 | 59 |
| 18 | 20 | $>10^{11}$ | $>10^{11}$ | 114 | 36 | 430 | 61 |
| 19 | 0 | $>10^{11}$ | $>10^{11}$ | 29 | 11 | 440 | 44 |

We claim:

1. In the process for imparting antistatic properties to rubber by blending the rubber with conductive carbon black, vulcanizing the resulting blend and forming the rubber, the carbon black having been made by subjecting hydrocarbons, which are liquid at room temperature, to thermal conversion at 1000° to 2000° C, under pressures within the range 1 and 80 atmospheres absolute, and in the presence of oxygen or an oxygen-containing gas, scrubbing the resulting carbon black-containing gas with water and separating the carbon black from the aqueous phase, the improvement which comprises intimately blending the aqueous, carbon black-containing phase with vaporizable liquid aliphatic or cycloaliphatic hydrocarbons at temperatures within the range 5 and 120° C, under pressures within the range 1 and 20 atmospheres absolute, at a pH-value of 7 to 10, and for a period of 1 to 20 minutes, separating liquid matter from the carbon black then heating and thereby freeing it from hydrocarbons and water, annealing the carbon black for 20 to 30 minutes at 200° C up to 2200° C and admixing the carbon black having a water absorption stiffness (AS-number) of 15 to 35, a specific electric resistance of $10^{-1}$ up to $10^{-3}$ ohms . cm under a moulding pressure of 100 to 180 atmospheres absolute, a bulk density of 100 to 180 g/liter, and a BET-surface area of 100 to 1000 $m^2/g$ with rubber material in an amount of about 5 to 40 weight %.

2. The process as claimed in claim 1, wherein natural or synthetic rubber is used.

3. The process as claimed in claim 1, wherein the rubber is admixed with 10 to 20 weight % of conductive carbon black, based on the rubber.

4. The process as claimed in claim 1, wherein a blend of rubber and addends is admixed with the conductive carbon.

5. The process as claimed in claim 4, wherein the addends comprise vulcanization accelerators, stabilizers, softeners and lubricants.

* * * * *